US010819257B1

(12) United States Patent
Khosravi et al.

(10) Patent No.: US 10,819,257 B1
(45) Date of Patent: Oct. 27, 2020

(54) RECONSTRUCTION OF AN AVERAGE MOTOR SUPPLY CURRENT USING PHASE CURRENT MEASUREMENT

(71) Applicant: Allegro MicroSystems, LLC, Manchester, NH (US)

(72) Inventors: Kamyar Khosravi, Manchester, NH (US); Masahira Kurihara, Edinburgh (GB); Andrew Adib, Musselburgh (GB); Robert D. Christie, Fife (GB)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 16/561,334

(22) Filed: Sep. 5, 2019

(51) Int. Cl.
*H02P 6/15* (2016.01)

(52) U.S. Cl.
CPC .................................. *H02P 6/153* (2016.02)

(58) Field of Classification Search
CPC ...... H02P 1/00; H02P 1/04; H02P 1/16; H02P 1/18; H02P 1/163; H02P 1/24; H02P 1/26; H02P 1/42; H02P 1/46; H02P 1/465; H02P 3/00; H02P 6/00; H02P 6/10; H02P 6/12; H02P 6/28; H02P 7/29; H02P 8/12; H02P 21/00; H02P 21/0003; H02P 21/14; H02P 21/22; H02P 23/00; H02P 23/0004; H02P 23/14; H02P 25/00; H02P 25/022; H02P 25/03; H02P 27/00; H02P 27/04; H02P 27/06; H02P 27/08; H02P 27/085; H02P 29/00; H03M 2201/2355; H03M 1/12; H03M 1/00

USPC ..... 318/400.01, 700, 701, 727, 400.21, 800, 318/801, 430
See application file for complete search history.

(56) References Cited

U.S. PATENT DOCUMENTS

| 5,256,949 A * | 10/1993 | Reichard ................... H02P 6/15 |
| | | 318/400.01 |
| 10,236,808 B2 * | 3/2019 | Murray ................... H02P 23/14 |
| 2016/0065087 A1 * | 3/2016 | Nagaoka ............ G01R 19/0092 |
| | | 324/139 |
| 2020/0021212 A1 | 1/2020 | Yamada et al. |
| 2020/0028456 A1 | 1/2020 | Morioka et al. |

OTHER PUBLICATIONS

U.S. Appl. No. 16/396,877, dated Apr. 9, 2019, Lu.
U.S. Appl. No. 16/535, dated Aug. 8, 2019, Khosravi et al.

* cited by examiner

*Primary Examiner* — Antony M Paul
(74) *Attorney, Agent, or Firm* — Daly, Crowley, Mofford & Durkee, LLP

(57) ABSTRACT

Systems and methods for computing an average supply current to a motor include a current sensor that is configured to sense a current through the motor. A converter is configured to sample the output of the current sensor at times that are established by a trigger signal and convert the samples into digital current values. A trigger signal generator generates the trigger signal based on one or more pulse width modulated (PWM) motor control signals within a PWM cycle. An average supply current value that indicates the average supply current to the motor is computed by a controller using the digital current values received from the converter.

17 Claims, 4 Drawing Sheets

RECONSTRUCTION OF AN AVERAGE MOTOR SUPPLY CURRENT USING PHASE CURRENT MEASUREMENT

BACKGROUND

Circuits to control and regulate electric motors, such as brushless DC ("BLDC") motors, are required in many applications. In many instances it is useful to know the average supply current provided to the motor, for example for circuit protection and current limiting purposes to protect hardware circuits and the motor from any current overshoots or surges that may cause damage to any component. Additionally, the average supply current can be useful to measure power consumption of the motor.

Phase currents can be measured with shunt resistors. The use of shunt resistors is an inexpensive approach and three phase motor systems can use one, two or three shunt resistors.

SUMMARY

A method for computing an average supply current provided to a motor includes sensing a current through the motor with a current sensor and generating a trigger signal based on one or more pulse width modulation (PWM) motor control signals within a PWM cycle. The output of the current sensor is sampled at times that are established by the trigger signal, and samples of the current sensor output are converted into digital current values. An average supply current value that is indicative of the average supply current to the motor is computed based on the digital current values.

In some embodiments, the current is sensed using one or more shunt resistors. Sensing the current can include coupling the inputs of an amplifier across one or more shunt resistors.

Generating the trigger signal can include generating the trigger signal at a midpoint of one or more portions of the PWM cycle of the one or more PWM motor control signals. Converting the samples of the current sensor output can include converting the current sensor output samples using an analog to digital converter.

In some embodiments, the motor includes three phases and each of a plurality of samples of the current sensor output is indicative of a current through one or more of a first phase or a second phase of the motor. Computing the average supply current can include computing the average supply current value using the plurality of samples. In some instances, computing the average supply current value can include integrating each of the plurality of samples over its corresponding PWM portion, summing the integration results, and dividing the summed integration results by the PWM cycle.

Also described is an apparatus that includes a current sensor for sensing a current through a motor, and a converter configured to sample an output of the current sensor at times that are established by a trigger signal generated by a trigger signal generator based on one or more pulse width modulation (PWM) motor control signals within a PWM cycle. The converter is further configured to convert the current sensor output samples into digital current values. A controller configured to compute an average supply current value that indicates an average supply current to the motor, can compute the average supply current based on the digital current values received from the converter.

Still further described is an apparatus that includes means for sensing a current through a motor with a current sensor and means for generating a trigger signal based on one or more of the pulse width modulation (PWM) motor control signals within a PWM cycle. Further included is means for sampling an output of the current sensor at times that are established by the trigger signal and means for converting samples of the current sensor output into digital current values.

Also included is means for computing an average supply current value indicative of an average supply current to the motor based on the digital current values.

BRIEF DESCRIPTION OF THE DRAWINGS

The foregoing and other objects, features and advantages will be apparent from the following more particular description of the embodiments and the appended claims, as illustrated in the accompanying drawings in which like reference characters refer to the same parts throughout the detailed description. Reference characters introduced in a figure may be repeated in one or more subsequent figures without additional description in the detailed description in order to provide context for other features of the described embodiments.

DETAILED DESCRIPTION

Figure 1:
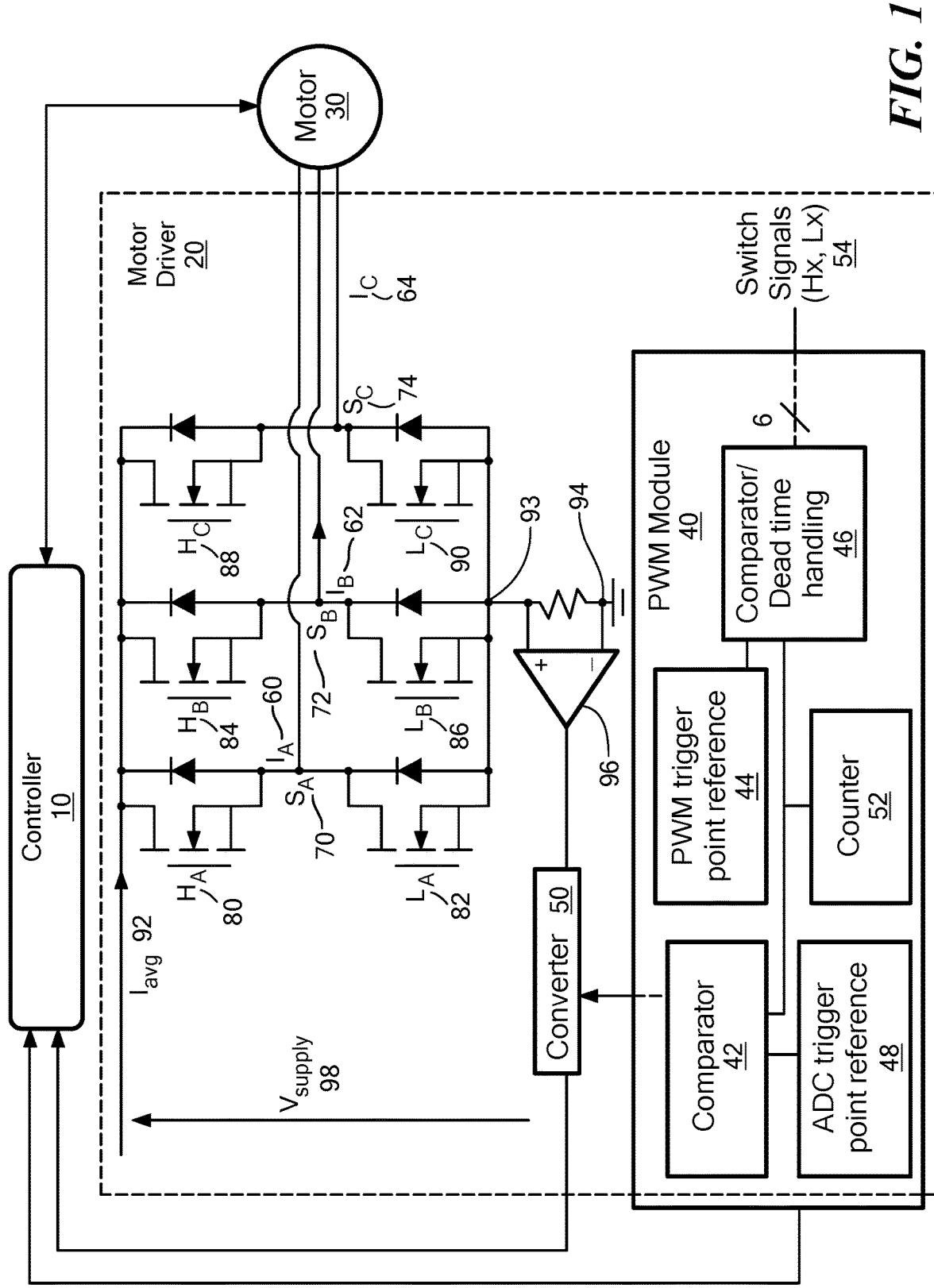
FIG. 1 is a circuit diagram depicting an embodiment of a motor driver circuit.

Referring to FIG. 1 a motor driver system includes a motor driver circuit 20 that provides voltage and current to a load, which can be a motor 30. The motor driver circuit 20 can include a shunt resistor 94, an amplifier 96, a PWM module 40, and a converter 50. A controller 10 can be coupled to the driver 20 and motor 30 to control aspects of the motor operation.

The motor driver 20 includes a plurality of switches 80-90 that are coupled to the motor 30 to drive current through each phase coil of the motor 30. A current sensor or shunt resistor 94 connected between the low side switches 82, 86, 90 and ground can be used to sense the current through the motor 30. The voltage across the shunt resistor 94 can be measured and sampled with an analog to digital (ADC) converter 50 to obtain digital values of the measured voltage. A sense amplifier 96 can be used to obtain or sense the voltage across the shunt resistor 94 and amplify the sensed voltage. A trigger signal 75 can be used to direct the converter 50 to obtain the voltage across the shunt resistor 94 at predetermined times. With this arrangement, the average motor current can be computed by sampling the current sensor 94 output at a midpoint of one or more portion of the PWM cycle of the motor control signals and computing the average based on a plurality of current sensor output samples. In this way, the average motor supply current can be reconstructed by integration and summation of a plurality of samples of the current sensor output taken at the midpoints of the PWM cycle portions.

More particularly, each phase of the motor 30 can be electrically connected to the motor driver 20 via one or more motor winding connection nodes "$S_A$" 70, "$S_B$" 72, "$S_C$" 74, where each of these connection nodes can have an associated current, "$I_A$" 60, "$I_B$" 62, and "$I_C$" 64 that flows into or out of the respective phase coils of the motor 30. While FIG. 1 illustrates a motor 30 that has a first phase ("phase A"), second phase ("phase B") and third phase ("phase C"), it should be appreciated that the motor driver 20 can deliver voltage and current to a motor having any number of phases.

Switches within the motor driver circuit 20 can be associated with a phase of the motor 30. For example, the voltage provided to the motor 30 during phase A can be pulse width modulated by the switching of high side switch "$H_A$" 80 and low side switch "$L_A$" 82, and the modulated potential can be provided at motor winding connection node $S_A$ 70. The voltage provided to the motor 30 during phase B can be pulse width modulated by the switching of high side switch "$H_B$" 84 and low side switch "$L_B$" 86, and the modulated potential can be provided at motor winding connection node $S_B$ 72. The voltage provided to the motor 30 during phase C can be pulse width modulated by the switching of high side switch "$H_C$" 88 and low side switch "$L_C$" 90, and the modulated potential can be provided at motor winding connection node $S_C$ 74. Thus, switches $H_A$ 80 and $L_A$ 82 are associated with phase A of the motor 30, switches $H_B$ 84 and $L_B$ 86 are associated with the phase B of the motor 30, and switches $H_C$ 88 and $L_C$ 90 are associated with the phase C of the motor 30. The switches 80, 82, 84, 86, 88, 90 can be any switch including high-speed analog switches such as a Field Effect Transistor (FET). Each switch 80, 82, 84, 86, 88, 90 can have a body diode associated therewith.

The switches within the motor driver circuit 20 can be pulse width modulated according to one or more control signals. The switches can be switched using center aligned pulse width modulated control signals. When the control signal is modulated using a center aligned modulation, the midpoint of each switch's PWM control signal is aligned. This alignment is demonstrated in FIGS. 3 and 4 where the switching waveform for the low side switches (i.e., $L_A$ 82, $L_B$ 86 and $L_C$ 90) are aligned at the center time period t3.

The controller 10 can be electrically and communicatively connected to the motor 30 and the motor driver 20, and in particular the converter 50 and the PWM module 40 within the motor driver 20. In some instances, the controller 10 can be electrically and communicatively connected to each switch 80, 82, 84, 86, 88, 90 such that the controller 10 can issue control signals to each switch to control its operation. The controller 10 can be a microcontroller, microprocessor, processor, a combination of logic gates or any other element capable of processing code or a set of instructions to carry out an algorithmic process. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital. A processor can contain internal processors or internal modules that perform portions of the function, operation, or sequence of operations of the processor. Similarly, a module can contain internal processors or internal modules that perform portions of the function, operation, or sequence of operations of the module.

It should be appreciated that while FIG. 1 illustrates a PWM module 40 outside of the controller 10, in some embodiments all or portions of the PWM module 40 can be included within the controller 10. For example, in some instances, any of the comparator for dead time handling 46, the PWM trigger point reference 44 and the ADC trigger point reference 48 can be included in the controller 10.

A supply voltage or potential ("Vsupply") 98 can be provided to the motor driver circuit 20. Current $I_{A-C}$ 60-64 is delivered to the motor phases (i.e., phase A, phase B, and phase C), by pulse width modulation ("PWM") control of switches 80, 82, 84, 86, 88, 90. More particularly, control signals generated by the controller 10 can be coupled to the control terminal (e.g., gate) of each of the switches 80, 82, 84, 86, 88, 90 to selectively turn on and off the switches with a predetermined sequence and duty cycle to actuate the motor 30.

A shunt resistor 94 senses the current flowing through each of the motor's phases, i.e., phase A, phase B, and phase C, and is connected between ground and a connection node 93 electrically connected to the low side switches of the motor driver 20. Current flows through the shunt resistor 94 when at least one low side switch, i.e. $L_A$ 82, $L_B$ 86, $L_C$ 90, is on or closed. When current flows through the shunt resistor 94, a voltage is generated across the resistor 94. A sense amplifier 96 that has inputs coupled across the shunt resistor 94 senses the voltage across the shunt resistor 94 and outputs a conditioned, sensed voltage signal to an analog to digital converter 50.

The shunt resistor 94 can be referred to as a current sensor, and in some instances the combination of the shunt resistor 94 and the sense amplifier 96 can be referred to as a current sensor. It should be appreciated that while FIG. 1 illustrates a single shunt resistor 94, the shunt resistor 94 can comprise two resistors, three resistors, or a resistor network of three or more resistors. In these embodiments, the shunt resistor 94 can be referred to as a shunt resistor network and the resistance value of the shunt resistor network is the sum of all resistors within the network. The sense amplifier 96 can both sense the voltage across the shunt resistor 94 and condition the sensed voltage signal so that aspects of the voltage signal comply with the input requirements of the converter 50. In some instances, the sense amplifier 96 can be referred to as a current sense amplifier 96 and can be configured to detect the phase current for each phase of the motor 30. The sense amplifier can have a programmable gain value that can be selected to optimize the power dissipation of the shunt resistor 94 or optimize the peak current measurement capability and current measurement accuracy of the shunt resistor 94 and sense amplifier 96 for the application within which the motor driver 20 is being used. Conditioning the voltage signal can include amplifying the voltage signal, attenuating the amplitude of the voltage signal, filtering out certain artifacts from the voltage signal, or inverting the voltage signal.

The converter 50 can be an analog to digital converter that converts the output of the sense amplifier 96 to a digital voltage signal. In some embodiments, the converter 50 can have input voltage requirements that require attenuation of the voltage output by the sense amplifier 96. The converter 50 outputs the digitized, sensed voltage values to the controller 10, and using the resistance value of the shunt resistor 94 and the voltage value output by the converter 50, the controller 10 can calculate the amount of current flowing through the shunt resistor 94.

Included within the PWM module 40 is a comparator that handles dead time 46 associated with the switch signals (Hx, Lx) 54. It will be appreciated that switch signals (Hx, Lx) 54 refer to control signals for switches $H_A$ 80, $H_B$ 84, $H_C$ 88, $L_A$ 82, $L_B$ 86 and $L_C$ 90. This dead time comparator 46 receives the switch control signals 54 and identifies periods of dead time within the received signals 54. When a high side switch opens and before a low side switch closes, there can be a period of time during which both switches are open. This period of time is referred to as dead time and is implemented to prevent short circuits within the system.

A PWM trigger point reference 44 receives the identified dead time periods from the dead time comparator 46 and uses the identified dead time periods to determine an optimum time period during each low side switch's PWM period to sample the shunt resistor 94 current. Determining when to sample the shunt resistor 94 and/or the sense comparator 96 includes identifying the midpoint for each PWM period of the low side switches (i.e., $L_A$ 82, $L_B$ 86, $L_C$ 90) and then shifting that midpoint by a time period equal to one-half of the corresponding dead time period. Identifying the midpoint for each PWM period and quantifying an amount of dead time can include using a number of counts corresponding to the counts generated by the counter 52. For example, the PWM trigger point reference 44 determines using the switch signal 54 for the $L_C$ 90 switch that the PWM period occurs from count one (1) to count twenty-seven (27) and therefore the midpoint of that PWM period occurs at count thirteen (13). The PWM trigger point reference 44 obtains dead time period information for switch $L_C$ 90; in this example the dead time period for that switch 90 can be two (2) counts. The PWM trigger point reference 44 shifts the midpoint of the $L_C$ switch's PWM period (i.e., thirteen) by a value equal to one-half of the dead time value (i.e., one) such that the modified midpoint is fourteen (14). The PWM periods for the low side switches 82, 86, 90 are center aligned and therefore have the same midpoint. In the previous example, if the midpoint of the $L_C$ switch's PWM period is fourteen (14), then the midpoint of the $L_A$ switch's PWM period and the $L_B$ switch's PWM period is also fourteen (14). By identifying the midpoint of the one switch's PWM period, the PWM trigger point reference 44 identifies the midpoint of all low side switches' PWM period.

It should be appreciated that in some embodiments, the controller 10 carries out the above-described methods and uses the switch signals 54 and the dead time period(s) identified by the dead time comparator 46 to identify the midpoint of each switch signal's PWM period and shift that midpoint by an amount equal to one-half of the corresponding dead time period. In these embodiments, the controller 10 can store the calculated midpoint as a PWM trigger point reference 44 value in a memory element within the PWM module 40.

Referenced above, the counter 52 included within the PWM module 40 counts incrementally for a predetermined period of time and is used to identify units of time within the motor driver 20 and the controller 10. For example, the counter 52 can continuously count from one to four thousand, or for any period of time. The counts of the counter 52 can be used to define PWM periods, dead time periods of time, the midpoint of each PWM period and trigger points.

The ADC trigger point reference 48 can be used to identify trigger reference values that can be used by a comparator 42 to generate a trigger signal 75. The trigger signal 75 can be relayed via a communication line between the comparator 42 and the converter 50. Once the midpoint for the PWM periods of the low side switches is identified by either the PWM trigger point reference 44 or the controller 10, the ADC trigger point reference 48 can calculate one or more trigger reference values. For example, the ADC trigger point reference 48 can use an obtained midpoint value of two thousand (2000) counts to identify trigger point references values at one thousand (1000) and three thousand (3000).

Comparator 42 receives a count value from the counter 52 and one or more trigger reference values from the ADC trigger point reference 48 and generates one or more trigger signals 75. This comparator 42 can be referred to as a trigger signal generator and can generate the trigger signal 75 by comparing a current count from the counter 52 to the ADC trigger point reference 48 value and outputting a trigger signal when the counter's count is the same as the count identified by the ADC trigger point reference 48.

The comparator 42 outputs trigger signals 75 to the converter 50 and the converter 50 uses the trigger signals 75 to determine when to sample the output of the sense comparator 96. In the previous example, the converter 50 would respond to the trigger signals 75 and sample the sense comparator 96 output at count one thousand (1000) and count three thousand (3000). In some embodiments, the converter 50 can further include a sample and hold circuit (S/H circuit) that holds the sampled value for a predetermined period of time or until the converter 50 receives another trigger signal. For example, when the converter 50 receives a trigger signal at count one thousand (1000), the converter 50 samples the output of the sense comparator 96, converts that output to a digital voltage signal and holds the digital voltage signal value until the next trigger signal at count three thousand (3000) is received.

As previously stated, the controller 10 obtains the voltage signal from the converter 50 and uses that value and the known resistance value of the shunt resistor 94 to calculate the current flow through the shunt resistor 94. The average supply current can be reconstructed by the controller 10 using these calculated shunt resistor 94 current values.

At any point in time, the current flowing through the shunt resistor 94 can be indicative of the phase current of one or more motor phases, therefore further processing is required to extract each phase current from the measured current. According to Kirchhoff's law, the sum of all currents in a three-phase machine is 0 as shown in Equation 1:

$$i_A + i_B + i_C = 0 \qquad \text{Equation 1}$$

where $i_A$ is the current through phase A of the motor 30, $i_B$ is the current through phase B of the motor 30 and $i_C$ is the current through phase C of the motor 30. As demonstrated by Equation 1, the sum of currents from two phases will give the negative of the third phase current (i.e., $i_A + i_B = -i_C$), therefore the third current can be calculated when the controller 10 knows the value of at least two currents.

Trigger reference values are determined so that the converter 50 samples the output of the sense comparator 96 at points in time when the current flowing through the shunt resistor 94 represents one or more phase currents of the motor 30. By calculating current values at certain points in time along the PWM period and knowing the points in time, the average supply current can be calculated using Equation 2:

$$i_{avg} = \frac{i_{avg1} t_1 + i_{avg2} t_2 + i_{avg3} t_3 + i_{avg4} t_4}{t_{PWM}} \qquad \text{Equation 2}$$

where $i_{avg1}$ is the current sampled by the converter 50 at the midpoint of time period t1, $i_{avg2}$ is the current sampled by the converter 50 at the midpoint of time period t2, $i_{avg3}$ is the current sampled by the converter 50 at the midpoint of time period t3, $i_{avg4}$ is the current sampled by the converter a 50 at the midpoint of time period t4, is the length of the first time period, t2 is the length of the second time period, t3 is the length of the third time period, t4 is the length of the fourth time period, and $t_{PWM}$ is the PWM time period. Equation 2 can be used to calculate the average supply current because current flows from a supply ($V_{supply}$, 98) to a load (motor 30), or from the load (motor 30) to the supply voltage ($V_{supply}$, 98) when one or two of the low side switches, i.e., $L_A$ 82, $L_B$ 86 and $L_C$ 90, are switched on. In other instances, (i.e., when no low side switches are switched on, or when all three low side switches are switched on), the current will recirculate through the phases of the load (motor 30). Therefore, by measuring current when one or two of the low side switches 82, 86, 90 are switched on and computing the average current value within each PWM period, Equation 2 can be used to determine the average supply current to the load (motor 30).

Figure 2:
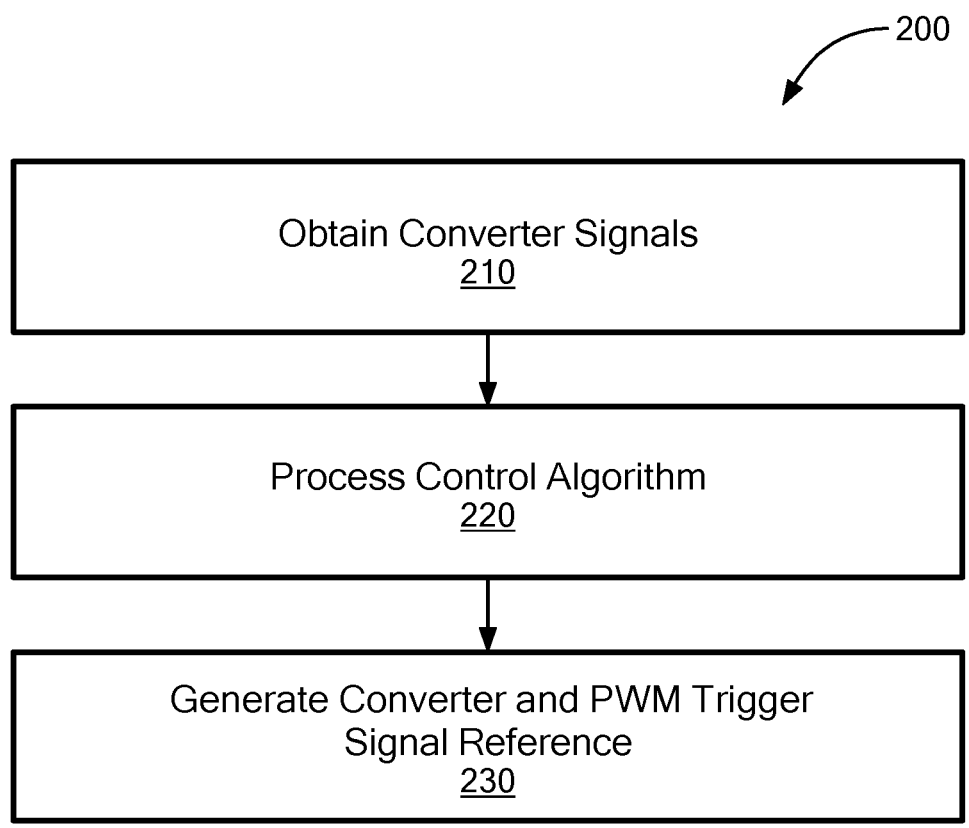
FIG. 2 is a block diagram illustrating an embodiment of the process for generating trigger signal references.

The controller 10 is electrically and communicatively connected to the PWM module 40 and can access various modules and stored values within the PWM module 40. For example, the value of the PWM trigger point reference 44 and the ADC trigger point reference 48 can be received from the PWM module 40 and/or generated by the controller 10 using values obtained from the converter 50 and the PWM module 40. Illustrated in FIG. 2 is a process 200 that can be executed by the controller 10 during operation of the motor driver 20. During this process 200, the controller 10 obtains the digital voltage signal generated by the converter 50 (step 210), executes a process control algorithm (step 220) to generate the value of the ADC trigger point reference 48 and the value of the PWM trigger point reference 44 (step 230). In some embodiments, the process control algorithm can be a field oriented control (FOC) algorithm. Additional steps of the method 200 can include storing the generated ADC trigger point reference 48 value and the PWM trigger point reference 44 value in a memory element within the PWM module 40 or elsewhere.

The controller 10 is communicatively and electrically connected to the converter 50 and receives the converted voltage signal from the converter 50. In some instances, the controller 10 can obtain a continuous voltage signal from the converter 50 and in other instances the controller 10 can obtain a voltage signal value from the converter 50 at discrete points in time that correspond to an ADC trigger point reference 48 value or a PWM trigger point reference 44 value (step 210). Using the sampled voltage signal from the converter 50 and the resistance value of the shunt resistor 94, the controller 10 can calculate the current flowing through the shunt resistor 94 at particular points in time. This calculation is repeated iteratively while the controller 10 continues obtaining converter 50 signals (step 210). The controller 10 also continuously calculates the ADC trigger point reference 48 and the PWM trigger point reference 44 using the switch signals 54 and the identified dead time periods (step 230). Iteratively calculating these trigger point reference values 44, 48 accounts for changes in the PWM periods of the switches 80, 82, 84, 86, 88, 90.

Figure 3:
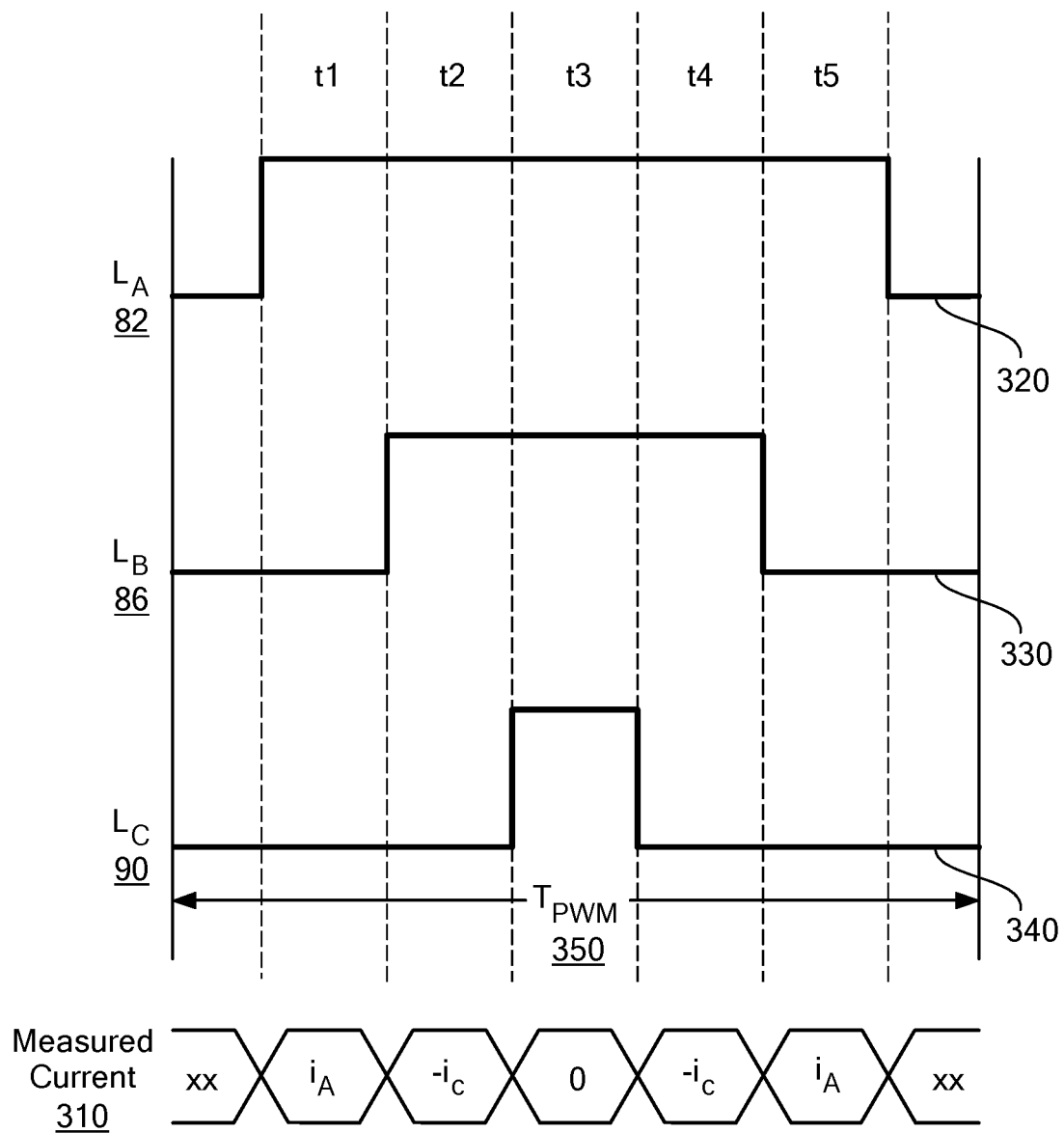
FIG. 3 illustrates example waveforms of the switch control signals and an indication of which phase current is measured by the shunt resistor.
Figure 4:
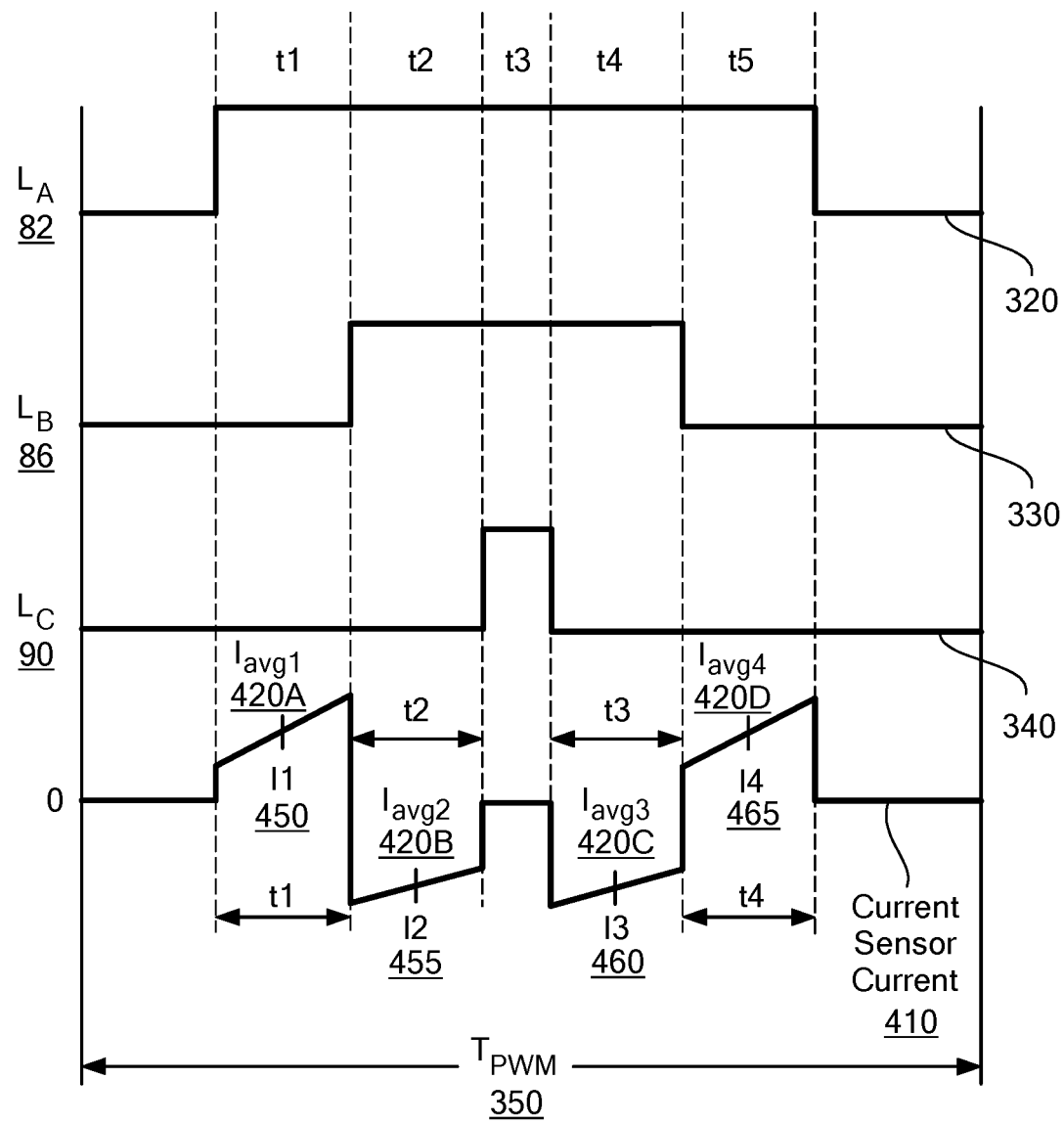
FIG. 4 illustrates example waveforms of the switch control signals and the current through the shunt resistor.

Illustrated in FIGS. 3 and 4 are waveforms 300, 400 of example control signals of low side switches $L_A$ 82, $L_B$ 86 and $L_C$ 90 during a single PWM period, $T_{PWM}$ 350. In particular, FIG. 3 illustrates current flow while FIG. 4 illustrates points at which the current can be sampled. It should be noted that FIG. 3 and FIG. 4 illustrate two separate examples of the systems and methods described herein, thus the signal, values and time periods in either set of waveforms are unrelated. These signals represent times of current flow through the shunt resistor 94 when the low side switches 82, 86, 90 are closed and conducting. Both FIGS. 3 and 4 illustrate instances of the PWM signal 320 for switch $L_A$ 82, the PWM signal 330 for switch $L_B$ 86 and the PWM signal 340 for switch $L_C$ 90. As shown in FIG. 3, the PWM signals 320, 330, 340 have a midpoint (center point) that occurs during t3. Additional portions of the PWM signals 320, 330, 340 are segmented according to time periods, i.e., t1, t2, t3, t4 and t5 during the PWM period $T_{PWM}$ 350, that correspond to measured current values 310 as demonstrated in Table 1:

TABLE 1

| t1 | t2 | t3 | t4 | t5 |
|---|---|---|---|---|
| $i_A$ | $-i_C$ | 0 | $-i_C$ | $i_A$ |

As demonstrated in Table 1, when the current through the shunt resistor 94 is sampled during t1, the measured current 310 is equivalent to the phase current for phase A of the motor 30, i.e., $i_A$. When the current through the shunt resistor 94 is sampled during t2, the measured current 310 is equivalent to the negative phase current for phase C of the motor 30, i.e., $i_C$. Per Equation 1, the negative current for phase C of the motor 30, $i_C$, is equal to the sum of the current through phase A and the current through phase B, i.e., $i_A+i_B$. The current sampled at time t4 is the same as the current sampled at t2, and the current sampled at t5 is the same as the current sampled at t1. When the current through the shunt resistor 94 is sampled during t3, the measured current 310 is zero (0) because at that point, all three phase currents are sampled, i.e., $i_A+i_B+i_C$. It should be noted that sensing the current through the shunt resistor 94 can include using the sense comparator 96 to sense the voltage across the shunt resistor 94, and using the controller 10 to ultimately calculate the current through the shunt resistor 94 using the sensed voltage and resistance value of the shunt resistor 94, as described above.

The controller can use the sensed $i_A$ and $-i_C$ current according to Equation 1 to determine the current through phase B of the motor 30. Upon determining the current through all phases of the motor 30, the controller can use Equation 2 to calculate the average supply current. Although FIGS. 3 and 4 illustrate values for a three phase motor, these methods can be used with a motor having any number of phases.

Illustrated in FIG. 4 are instances of the PWM signals 320, 330, 340 for the low side switches, $L_A$ 82, $L_B$ 86, $L_C$ 90, and an estimation of the current 410 through the current sensor. As stated above, the current sensor can include any combination of the shunt resistor 94, sense comparator 96, converter 50 and the current calculation algorithm executed by the controller 10. In most cases, the current sensor current 410 represents the current in one or more phases of the motor 30 which is equivalent to the current flowing through the shunt resistor 94. FIG. 4 illustrates the waveforms for a single PWM period, $T_{PWM}$ 350, where the waveforms are segmented into five time periods, t1, t2, t3, t4 and t5. The current sensor current 410 during those time periods is illustrated on the waveform 410 and segmented accordingly, the results of which are listed in Table 2.

TABLE 2

| t1 | t2 | t3 | t4 | t5 |
|---|---|---|---|---|
| $I_{avg1}$ | $I_{avg2}$ | 0 | $I_{avg3}$ | $I_{avg4}$ |

Because the current sensor current 410 is recreated using the digital voltage values from the converter 50, the actual waveform 410 illustrated in FIG. 4 is representative of the current sensor current 410. The measured current values are illustrated as sampled points within the segments t1-t4 of the current sensor current 410. Samples are obtained by the converter 50 in response to the trigger signal 75 generated by the comparator 42. For example, in response to a trigger signal 75 generated during t1, the converter 50 takes a first sample of the voltage output signal generated by the sense amplifier 96. This sample represents a current value, I1 450, taken during t1 and corresponding to the current through phase A, $i_A$, of the motor 30. Table 3 illustrates other sampled values:

TABLE 3

| Time Period | t1 | t2 | t3 | t4 | t5 |
|---|---|---|---|---|---|
| Current through the Current Sensor | $I_{avg1}$ | $I_{avg2}$ | 0 | $I_{avg3}$ | $I_{avg4}$ |
| Sampled Current | I1 | I2 | N/A | I3 | I4 |
| Corresponding Phase Current | $i_A$ | $-i_C$ | 0 | $-i_C$ | $i_A$ |

Using the sampled current values, i.e., I1 450, I2 455, I3 460 and I4 465, and the values of the time period, the controller 10 can reconstruct the average supply current in accordance with Equation 2. It should be appreciated that prior to applying Equation 2 to the obtained values, the output of the converter 50 obtained by the controller 10 is used to calculate the corresponding current through the shunt resistor 94.

It should be appreciated that the circuit architectures and methods described herein are merely embodiments of the system for reconstructing the average current supplied to a motor, and that aspects of this system can be modified while maintaining the function of the system. All publications and references cited herein are expressly incorporated by reference in their entirety.

The invention claimed is:

1. A method for computing an average supply current to a motor, the method comprising:
   sensing a current through the motor with a current sensor, wherein the motor comprises three phases, wherein each of a plurality of samples of the current sensor output is indicative of a current through one or more of a first phase of the motor and a second phase of the motor;
   generating a trigger signal based on one or more pulse width modulation (PWM) motor control signals within a PWM cycle;
   sampling an output of the current sensor at times established by the trigger signal;
   converting samples of the current sensor output into digital current values; and
   computing an average supply current value using the plurality of samples by integrating each of the plurality of samples over its corresponding PWM portion, summing the integration results, and dividing the summed integration results by the PWM cycle, the average supply current value being indicative of the average supply current to the motor based on the digital current values.

2. The method of claim 1, wherein sensing the current comprises sensing the current with one or more shunt resistors.

3. The method of claim 2, wherein sensing the current comprises coupling inputs of an amplifier across the one or more shunt resistors.

4. The method of claim 1, wherein generating the trigger signal comprises generating the trigger signal at a midpoint of one or more portions of the PWM cycle of the one or more PWM motor control signals.

5. The method of claim 1, wherein converting samples of the current sensor output comprises converting the current sensor output samples using an analog to digital converter.

6. Apparatus comprising:
   a current sensor configured to sense a current through a motor comprising three phases, wherein each of a plurality of samples of the current sensor output is indicative of a current through one or more of a first phase of the motor and a second phase of the motor;
   a converter configured to sample an output of the current sensor at times established by a trigger signal and to convert the current sensor output samples into digital current values;
   a controller configured to compute an average supply current value indicative of an average supply current to the motor based on the digital current values received from the converter using the plurality of samples by integrating each of the plurality of samples over its corresponding PWM portion, summing the integration results, and dividing the summed integration results by the PWM cycle; and
   a trigger signal generator configured to generate the trigger signal based on one or more pulse width modulation (PWM) motor control signals within a PWM cycle.

7. The apparatus of claim 6, wherein the current sensor comprises one or more shunt resistors.

8. The apparatus of claim 7, wherein the current sensor further comprises an amplifier having inputs coupled across the one or more shunt resistors.

9. The apparatus of claim 6, wherein the trigger signal generator is configured to generate the trigger signal at a midpoint of one or more portions of the PWM cycle of the one or more PWM motor control signals.

10. The apparatus of claim 6, wherein the converter comprises an analog to digital converter.

11. Apparatus comprising:
    means for sensing a current through a motor with a current sensor;
    means for generating a trigger signal based on one or more pulse width modulation (PWM) motor control signals within a PWM cycle;
    means for sampling an output of the current sensor at times established by the trigger signal;
    means for converting samples of current sensor output into digital current values; and
    means for computing an average supply current value indicative of an average supply current to the motor based on the digital current values, the computing means for computing the average supply current value comprising means for integrating each of the plurality of samples over its corresponding PWM portion, summing the integration results, and dividing the summed integration results by the PWM cycle.

12. The apparatus of claim 11, wherein the sensing means comprises one or more shunt resistors.

13. The apparatus of claim 12, wherein the sensing means comprises an amplifier having inputs coupled across the one or more shunt resistors.

14. The apparatus of claim 11, wherein the trigger signal generating means comprises means for generating the trigger signal at a midpoint of one or more portions of the PWM cycle of the one or more PWM motor control signals.

15. The apparatus of claim 11, wherein the converting means comprises an analog to digital converter.

16. The apparatus of claim 11, wherein the motor comprises three phases and wherein each of a plurality of samples of the current sensor output is indicative of a current through one or more of a first phase of the motor and a second phase of the motor.

17. The apparatus of claim 16, wherein the computing means comprises means for computing the average supply current value using the plurality of samples.

* * * * *

UNITED STATES PATENT AND TRADEMARK OFFICE
CERTIFICATE OF CORRECTION

Page 1 of 1

PATENT NO. : 10,819,257 B1
APPLICATION NO. : 16/561334
DATED : October 27, 2020
INVENTOR(S) : Kamyar Khosravi et al.

It is certified that error appears in the above-identified patent and that said Letters Patent is hereby corrected as shown below:

In the Specification

Column 2, Line 57 delete "portion" and replace with --portions--.

Column 6, Line 5 delete "references" and replace with --reference--.

Column 7, Line 6 delete "a 50" and replace with --50--.

Column 7, Line 6 delete "t4, is" and replace with --t4, t1 is--.

Column 8, Line 54 delete "switches," and replace with --switches--.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*